United States Patent
Battlogg

[19]

[11] Patent Number: 5,887,557
[45] Date of Patent: Mar. 30, 1999

[54] CAMSHAFT WITH DRIVE, BEARING AND CAM ELEMENTS

[76] Inventor: Stefan Battlogg, Haus Nr. 166, 6771 St. Anton Im Montafon, Austria

[21] Appl. No.: 47,163

[22] Filed: Mar. 23, 1998

[30] Foreign Application Priority Data

Mar. 21, 1997 [AT] Austria ............................... 493/97
Apr. 28, 1997 [AT] Austria ............................... 727/97

[51] Int. Cl.⁶ .................... F01L 13/00; F01L 1/047
[52] U.S. Cl. .......................... 123/90.17; 123/90.18; 123/90.6; 74/568 R
[58] Field of Search ............... 123/90.15, 90.17, 123/90.18, 90.6; 74/567, 568 R

[56] References Cited

U.S. PATENT DOCUMENTS

| | | | |
|---|---|---|---|
| 3,489,032 | 1/1970 | Severn . | |
| 4,352,344 | 10/1982 | Aoyama et al. | 123/90.18 |
| 4,597,365 | 7/1986 | Madaffer | 123/90.6 |
| 4,644,912 | 2/1987 | Umeha et al. | 123/90.34 |
| 4,730,588 | 3/1988 | Maeda | 123/90.6 |
| 5,158,049 | 10/1992 | Neumann | 123/90.6 |
| 5,218,883 | 6/1993 | Swars | 74/567 |
| 5,253,546 | 10/1993 | Elrod et al. | 74/568 R |
| 5,359,970 | 11/1994 | Krebs | 123/90.6 |
| 5,505,168 | 4/1996 | Nagai et al. | 123/90.17 |
| 5,577,420 | 11/1996 | Riemscheid et al. | 123/90.6 |

FOREIGN PATENT DOCUMENTS

| | | |
|---|---|---|
| 0 108 238 A1 | 5/1984 | European Pat. Off. . |
| 0 116 306 A1 | 8/1984 | European Pat. Off. . |
| 0 119 112 A1 | 9/1984 | European Pat. Off. . |
| 0 170 187 A1 | 2/1986 | European Pat. Off. . |
| 0 178 536 A1 | 4/1986 | European Pat. Off. . |
| 0 178 537 A1 | 4/1986 | European Pat. Off. . |
| 0 190 841 A2 | 8/1986 | European Pat. Off. . |
| 0 282 166 A1 | 9/1988 | European Pat. Off. . |
| 0 292 795 A1 | 11/1988 | European Pat. Off. . |
| 0 303 845 A1 | 2/1989 | European Pat. Off. . |
| 0 364 028 A1 | 4/1990 | European Pat. Off. . |
| 0 389 070 A2 | 9/1990 | European Pat. Off. . |
| 0 486 876 A2 | 5/1992 | European Pat. Off. . |
| 0 521 354 A1 | 1/1993 | European Pat. Off. . |
| 0 590 577 A1 | 4/1994 | European Pat. Off. . |
| 0 745 757 A1 | 12/1996 | European Pat. Off. . |
| 2 492 454 | 4/1982 | France . |
| 129 270 | 6/1919 | United Kingdom . |

OTHER PUBLICATIONS

International Publication No. 93/10336 (Berg et al.), dated May 27, 1993.

Abstract of French Patent No. 2 694 786 A1 (Damien), dated Feb. 18, 1994.

Abstract of German Published, Non–Prosecuted Application No. 42 30 877 A1 (Eggers), dated Apr. 1, 1993.

*Primary Examiner*—Weilun Lo
*Attorney, Agent, or Firm*—Herbert L. Lerner; Laurence A. Greenberg; Werner H. Stemer

[57] ABSTRACT

The camshaft is formed with two or more central rods. The rods are parallel to one another. Camshaft elements are mounted on the rods. The camshaft elements include a drive element for rotatingly driving the camshaft, bearing elements, and cam elements mounted on the rods.

16 Claims, 7 Drawing Sheets

CAMSHAFT WITH DRIVE, BEARING AND CAM ELEMENTS

BACKGROUND OF THE INVENTION

1. Field of the Invention

The invention pertains to internal combustion engines and, more specifically, to camshafts with drive elements, bearing elements, and cam elements.

2. Description of the Related Art

Many different possibilities have been disclosed in the prior art for securing camshaft elements to a carrier shaft in a rotationally fixed relationship. Special methods include widening of a hollow shaft in the region of the camshaft elements that have a nonround insertion opening (European Patent Disclosures EP-A 190 841, EP-A 282 166, EP-A 303 845, EP-A 389 070); sintering the powdered-metal cam elements onto the shaft (EP-A 364 028); inserting corrugated tension sleeves between a longitudinally fluted carrier shaft and the cam element that also has a fluted insertion opening (EP-A 745 757); firmly gluing the cam elements to a longitudinally fluted carrier shaft (EP-A 119 112); circumferentially fluted regions on the carrier shaft, which are deformed by the camshaft elements (EP-A 486 876, EP-A 521 354); firmly screwing the camshaft elements to the carrier shaft (PCT publication WO-A 93/10336); firmly clamping or wedging the camshaft elements to the carrier shaft (EP-A 170 187, EP-A 178 536, EP-A 178 537), and so forth.

By means of what is known as variable valve control, it is possible to successfully optimize the various given conditions for the wide speed (rpm) and load range of an internal combustion engine.

The concept of variable valve control allows varying both the opening and closing times of the individual valves and their stroke. Along with rotating the entire camshaft or individual cam elements, it is also known to displace either the entire camshaft (EP-A 108 238, EP-A 116 306, EP-A 590 577), or individual cam elements (U.S. Pat. Nos. 5,359,970, 4,730,588, and 5,158,049), or intermediate members (French patent disclosure FR 26 94 786) in the longitudinal direction of the camshaft. In U.S. Pat. No. 5,359,970, for example, the displaceable cam elements have a protrusion profile, but have the same base circle radius as the axially nondisplaceable cam elements. Each displaceable cam element is urged in the displacement direction and rests with the larger cam region on an intermediate member that forms a stop. Upon attaining the base circle region it is axially displaced so that the existing nondisplaceable cam element is functionally disconnected. The displacement is effected by means of a sleeve that is displaceable on the camshaft and can be acted upon hydraulically, and the restoration is effected via a spring surrounding the camshaft and supported on the nondisplaceable cam element.

SUMMARY OF THE INVENTION

It is accordingly an object of the invention to provide a camshaft with drive elements, bearing elements, and cam elements, which overcomes the above-mentioned disadvantages of the prior art devices of this general type and which is less expensive and less complicated in terms of the camshaft element configuration that is secured against relative rotation in the circumferential direction and which may, preferably, also be longitudinally displaceable.

With the foregoing and other objects in view there is provided, in accordance with the invention, a camshaft, comprising:

a plurality of mutually parallel rods; and camshaft elements mounted on the rods, the camshaft elements including a drive element attached to the rods for rotatingly driving the rods, bearing elements, and cam elements mounted on the rods.

In other words, the primary novelty of the invention resides in the feature according to which the camshaft elements are carried on at least two parallel rods. The term plurality as used herein, as will be described in the following, is any useful number of two or more.

The structure, and indeed the assembly, of a camshaft according to the invention is extremely simple. Camshaft elements provided with corresponding insertion openings, namely cam elements that actuate, say, intake and exhaust valves of internal combustion engines, bearing rings with which the camshaft is supported in bearing blocks, at least one drive element, and so forth, are thrust onto the rods in the desired order. At most an axial fixation of the elements is needed, but not a fixation in the rotational direction.

The number of rods depends on various criteria: At least two are necessary for form locking in the circumferential direction of the camshaft elements; three or more rods increase the torsional strength of the camshaft. The number of rods can also be determined by the number of cam positions and by the number of different cam types that are needed.

Furthermore, the rods can either rest tightly against one another or be spaced apart. Rods resting tightly against one another, which may optionally also be glued, welded or otherwise joined to one another, in turn increase the torsional strength of the camshaft. Conversely, spaced-apart rods allow the disposition of a compensation mass, which for example in the form of a sleeve is thrust onto a rod opposite a cam.

Rods resting tightly against one another form a bundle, which requires only a single insertion opening in the camshaft element, which is composed of merging openings and whose edge is composed of a number of circular arcs corresponding to the number of rods. Bundles of rods resting tightly against one another may also have more than three rods, if they are disposed around a central rod.

For example, six rods can be disposed around a central rod, touching one another, if the central rod has the same diameter as they do. On the other hand, if its diameter differs, then the bundle can include more or fewer rods. Camshaft elements with an insertion opening corresponding to the bundle can be made with maximum dimensional accuracy by known sintering processes.

If the rods are spaced apart, then each camshaft element has a number of insertion openings that corresponds to the number of rods, and the cross section of these openings is equivalent to the rod cross section. Moreover, each rod may be cylindrical or hollow-cylindrical, or may have three or more sides or be oval in shape. The camshaft elements threaded onto the rods may be individually spaced apart; axial fixation can be done for instance by means of the aforementioned sleeves, which are either individually thrust onto the rods or surround all the rods in common. Camshaft elements may also be combined into functional groups, in which case intermediate spacer pieces within the group are unnecessary.

In accordance with an added feature of the invention, at least two camshaft elements are combined into a one-piece unit. The type of structural/functional combination depends on the production process chosen. If the units are made by a sintering process, then a unit may in particular include one cam element and one bearing element. Such a unit can then be joined to either a single cam element or to a second such unit, and arbitrary types of connections can be chosen. If the rods do not rest against one another, then the elements or units can be combined by a central screw, with the aid of which the elements can be axially clamped firmly to the rods as well. Spreader or clamping elements that widen or narrow under pressure are conceivable. Another possibility is for the insertion openings to extend slightly obliquely in the end faces to be joined together, so that the parts screwed together are braced against the rods. The bearing elements, and in particular two abutting bearing rings, may also act as a carrier or as part of a roller bearing. The rods may be embodied as hollow or solid. Hollow rods can have female threads on their ends, into which screws are inserted whose heads axially fix the outermost camshaft elements. Solid rods may be embodied as screw bolts, whose heads are braced against an outermost camshaft element, and their ends that have threads are screwed into threaded bores of a disk that axially fixes the second camshaft element from the outside.

A variable valve control can be achieved with a camshaft according to the invention in a simple way by providing that at least one rod is displaceable in the longitudinal direction of the camshaft, and at least one cam element is coupled to the displaceable rod.

With the disposition of a plurality of rods it becomes possible to use at least one rod for the displacement of displaceable cam elements and to locate a required actuator at the end of the camshaft, without having to displace the entire camshaft. Since the displacement can occur only in the closing position of the respective valve, or in other words whenever the base circle region of the displaceable cam element becomes effective, only slight adjusting forces are necessary. For the adjustment drive, arbitrary suitable means can therefore be employed, for instance a pressure-fluid-actuated or an electromagnetic adjusting unit, driven elements with two- or three-dimensional cam paths, threaded spindles, and so forth.

In accordance with one feature of the invention, all the displaceable cam elements are disposed on one common, displaceable rod, and each cam element is disposed on the displaceable rod so as to be displaceable by the displacement length of the rod by spring action at least in the displacement direction. In this embodiment, all the displaceable cam elements are individually displaceable, because with a displaced rod they are displaced only by the spring acting upon them when the base circle region cooperates with the valve actuator, since the displacement in the increased cam region of the displaceable cam element is blocked by the valve actuator (valve tappet, tilting lever, etc.). Preferably, one annular abutment and one adjusting spring per displaceable cam element are provided for this purpose on the displaceable rod. The restoration is preferably likewise effected via a spring, which in particular is braced against a nondisplaceable camshaft element (cam element, bearing element or drive element). Optionally, an abutment may also be provided for this purpose on the displaceable rod.

In accordance with another feature of the invention, each displaceable cam element is fixed to its own displaceable rod. This increases the number of parallel rods. For a four-cylinder in-line engine, for instance, the camshaft elements may be threaded onto four individually displaceable rods, while for a six-cylinder V-type engine the camshaft elements for three cylinders together may be threaded onto three individually displaceable rods. The rods are accordingly disposed at the corners of an equilateral triangle, a square, or other regular polygon which provides for proper center of gravity placement.

In accordance with again another feature of the invention, there are provided displaceable rods and nondisplaceable rods. In that case, it is preferably provided that every nondisplaceable rod, as a carrier rod of the camshaft elements, has a larger diameter than the displaceable rod.

The fact that the cam elements are individually displaceable allows a variation of the valve opening time, valve closing time, valve opening period and the valve stroke whenever the displaceable cam element, in addition to a nondisplaceable, smaller cam element, can act on the same valve actuator, and hence replaces the smaller cam element during its use.

The individual displaceability of a cam element can also, however, be utilized to take a cylinder out of operation, if the displaceable cam element is the only cam element associated with the valve actuator of the cylinder, or if both cam elements assigned to the specific valve actuator are displaceable.

Other features which are considered as characteristic for the invention are set forth in the appended claims. Although the invention is illustrated and described herein as embodied in a camshaft with drive, bearing and cam elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
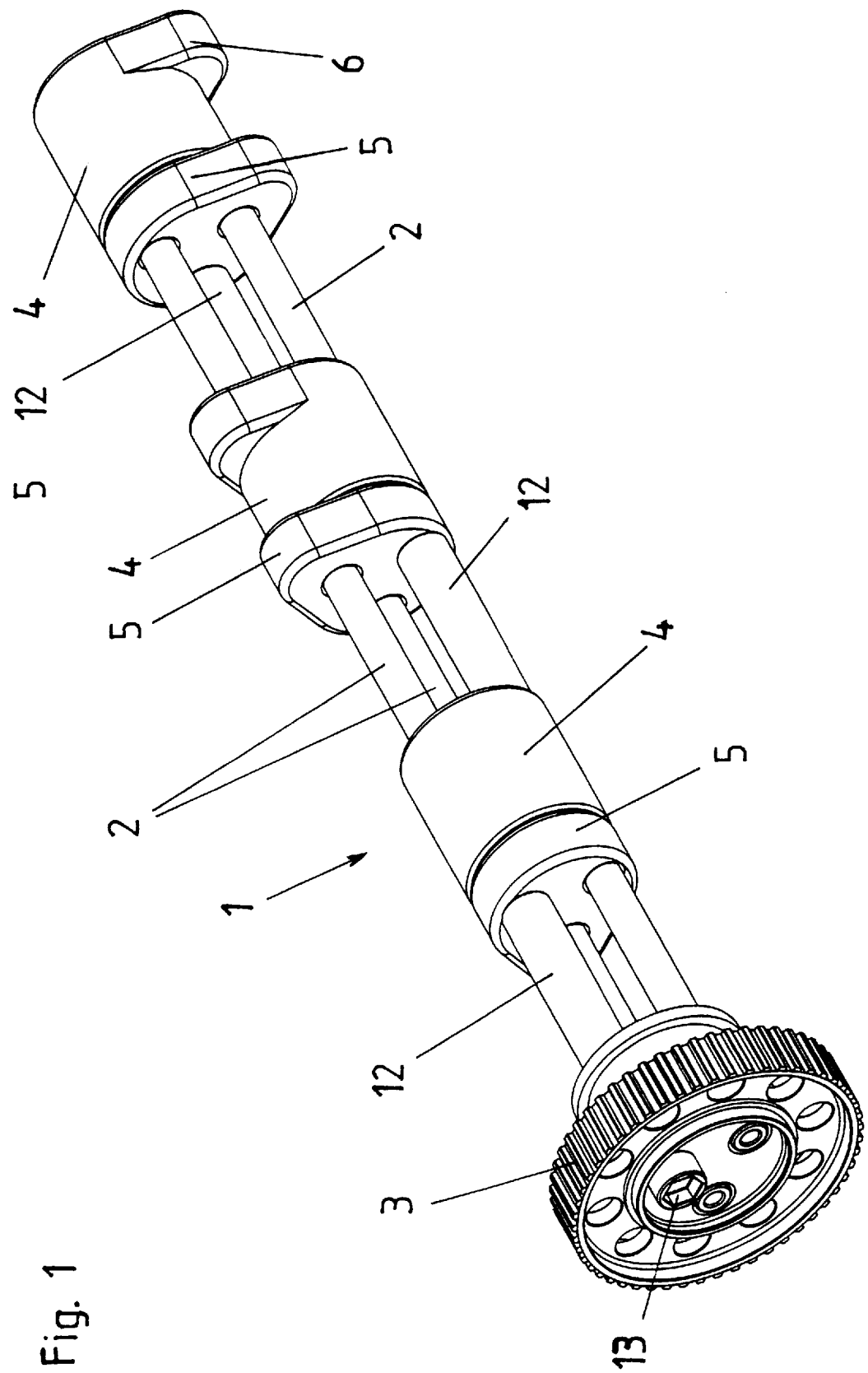
FIG. 1 a perspective view of a three-rod camshaft.
Figure 2:
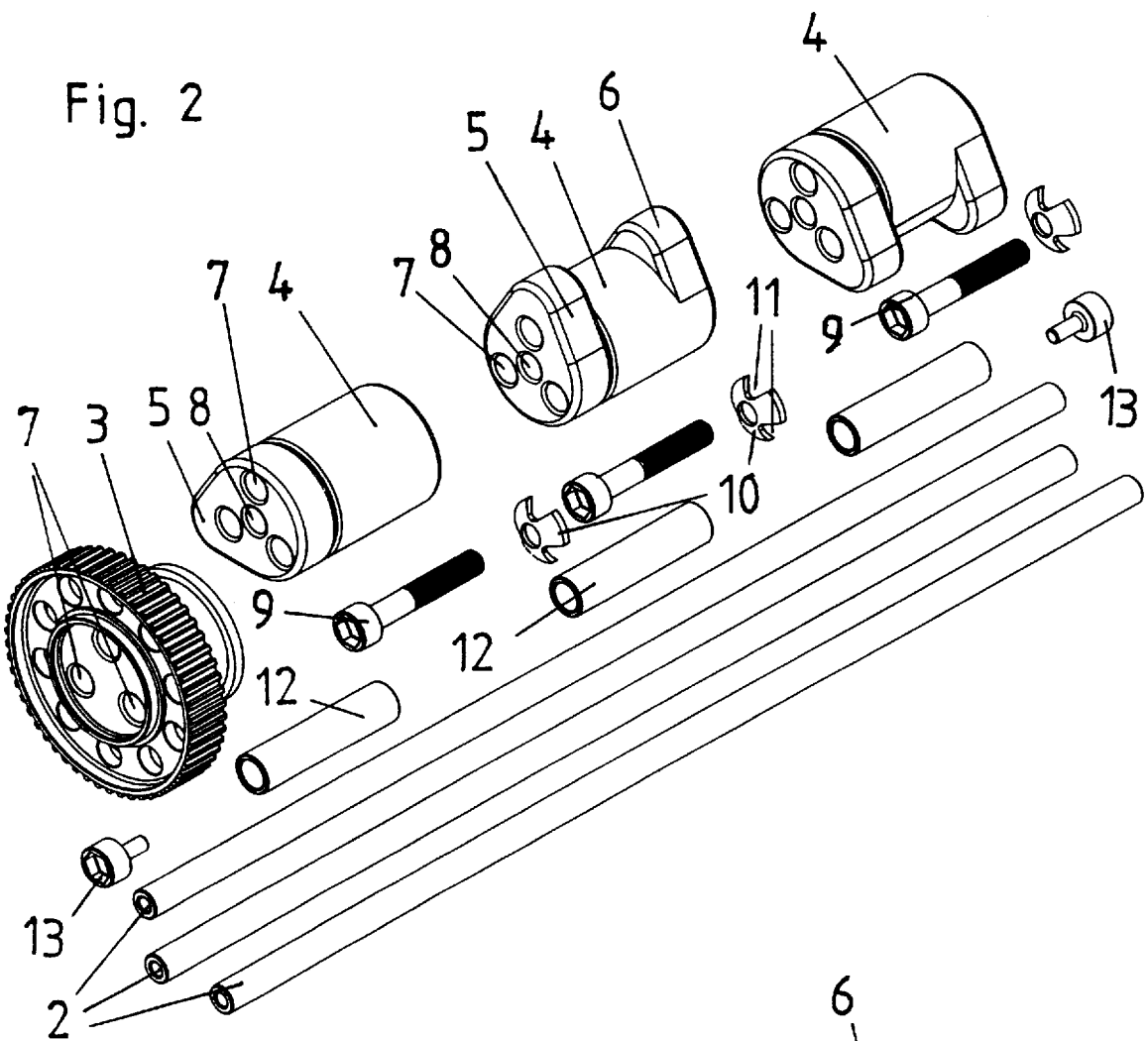
FIG. 2 is a perspective aggregate view of the individual components of the three-rod camshaft similar to FIG. 1.

Referring now to the figures of the drawing in detail and first, particularly, to FIGS. 1 and 2 thereof, there is seen a a camshaft 1, for instance for actuating six valves of an internal combustion engine. The camshaft has a drive element 3, here in the form of a spur gear, as well as cam elements 5 and bearing elements 4, which are supported in bearing blocks affixed to the engine. The camshaft elements 4, 5 are arranged in functional groups. In the group adjacent to the drive element 3 and in the farthest-right-hand group, one cam element 5 and one bearing element 4, on which a cam 6 is formed, are joined together. The middle group has a threepart structure comprising two cam elements 5 and one bearing element 4.

Figure 3:
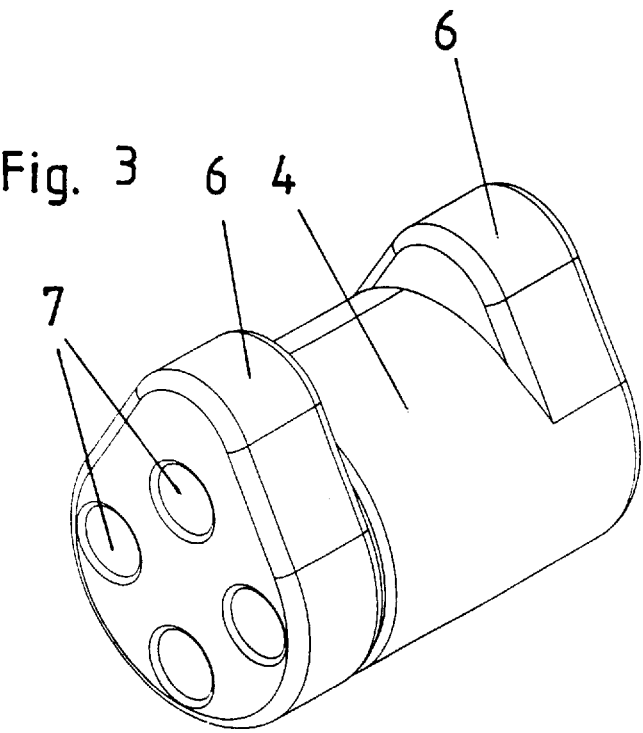
FIG. 3 is a perspective view of a camshaft element of a four-rod exemplary embodiment.
Figure 4:
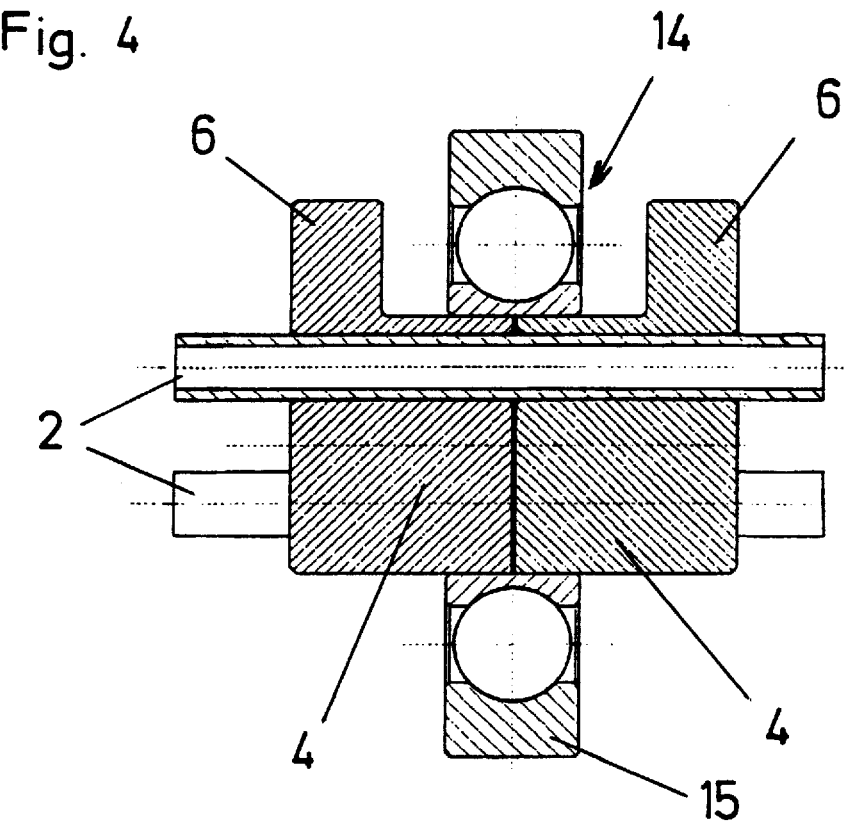
FIG. 4 is a longitudinal sectional view taken through a fourth exemplary embodiment.

Other possibilities are also conceivable, such as a one-piece structure as in FIG. 3, in which there are two cams 6 formed on the bearing element 4, or as in FIG. 4, in which two bearing elements 4 are joined together that each carry one cam 6. The camshaft 1 is assembled from the individual parts, and instead of the conventional carrier shaft, at least two mutually parallel rods 2 are provided, onto which the camshaft elements 3, 4, 5 are threaded. The camshaft elements 3, 4, 5 are thereby fixed against relative rotation in the circumferential direction of the camshaft 1, without requiring a fixation in this direction. The geometric axis of the camshaft is located in the axis of symmetry or shear line between the rods 2, so that the camshaft elements 3, 4, 5 are centered and have eccentric circumferential faces.

Figure 5:
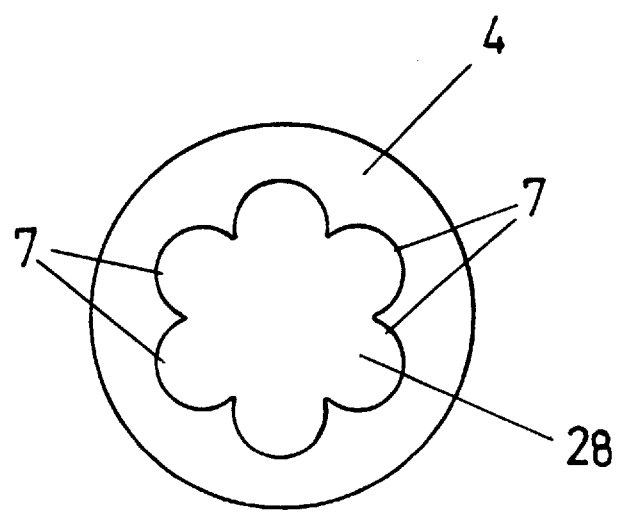
FIG. 5 is an elevational view onto a bearing element of a six-or seven-rod camshaft.
Figure 6:
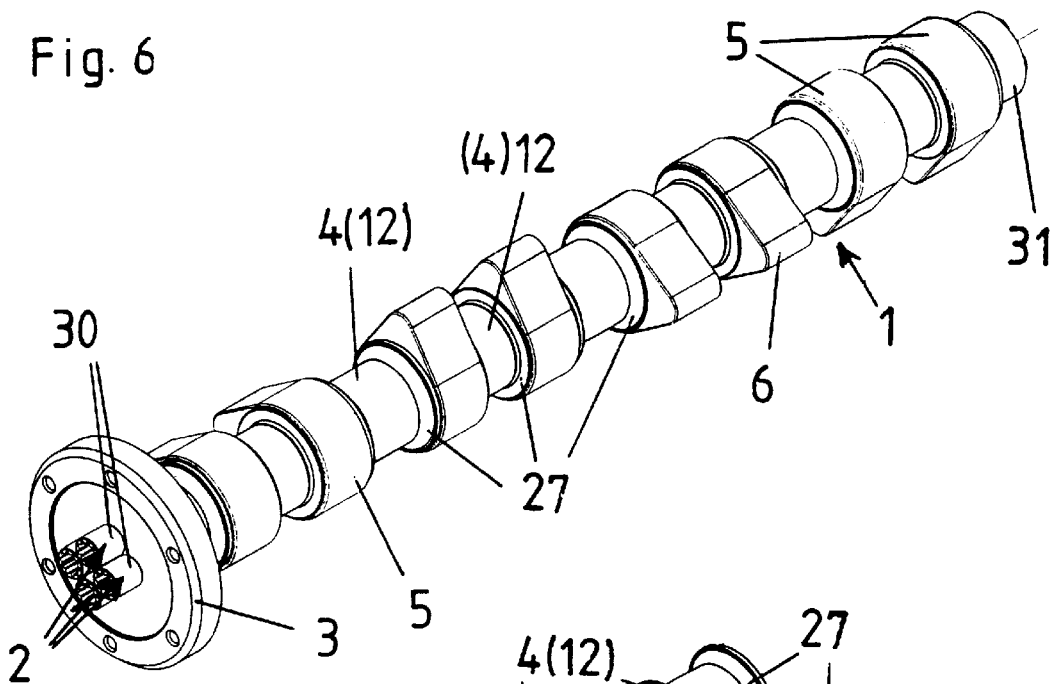
FIG. 6 is a perspective view of a further four-rod exemplary embodiment.
Figure 8:
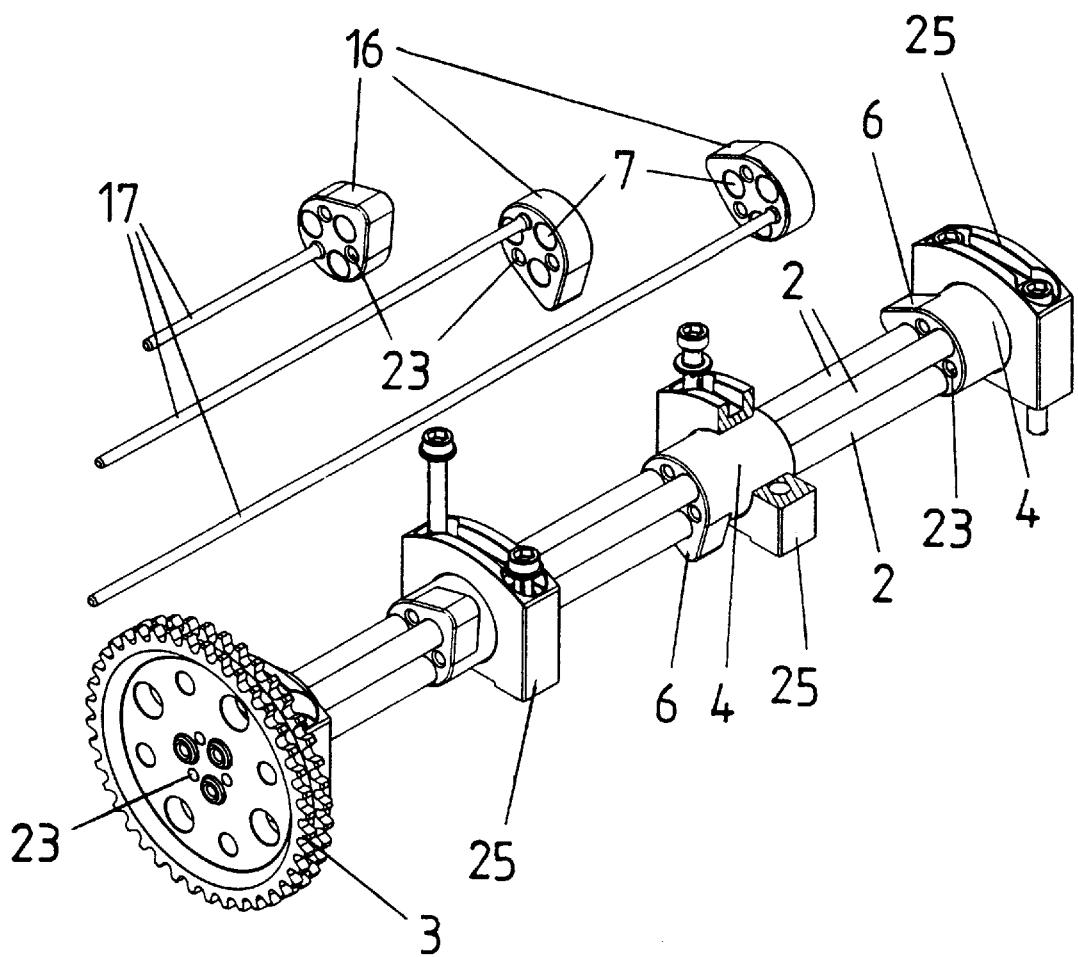
FIG. 8 is a partly exploded, perspective view of the components of a six-rod camshaft with three displaceable cam elements.

In the embodiment of FIG. 1, a three-rod camshaft is shown. The rods 2 are disposed, in spaced-apart relationship, in an equilateral triangle. The geometric axis of the camshaft extends through the center of gravity of the triangle. FIG. 3 shows a camshaft element for a four-rod camshaft, whose four rods 2 are located, in a spaced-apart relationship, in a square. FIG. 5 shows a bearing element 4 for a six-rod camshaft, whose rods touch one another; FIG. 6 shows a second embodiment of a four-rod camshaft. Finally, FIG. 8 shows a second embodiment of a six-rod camshaft.

Figure 7:
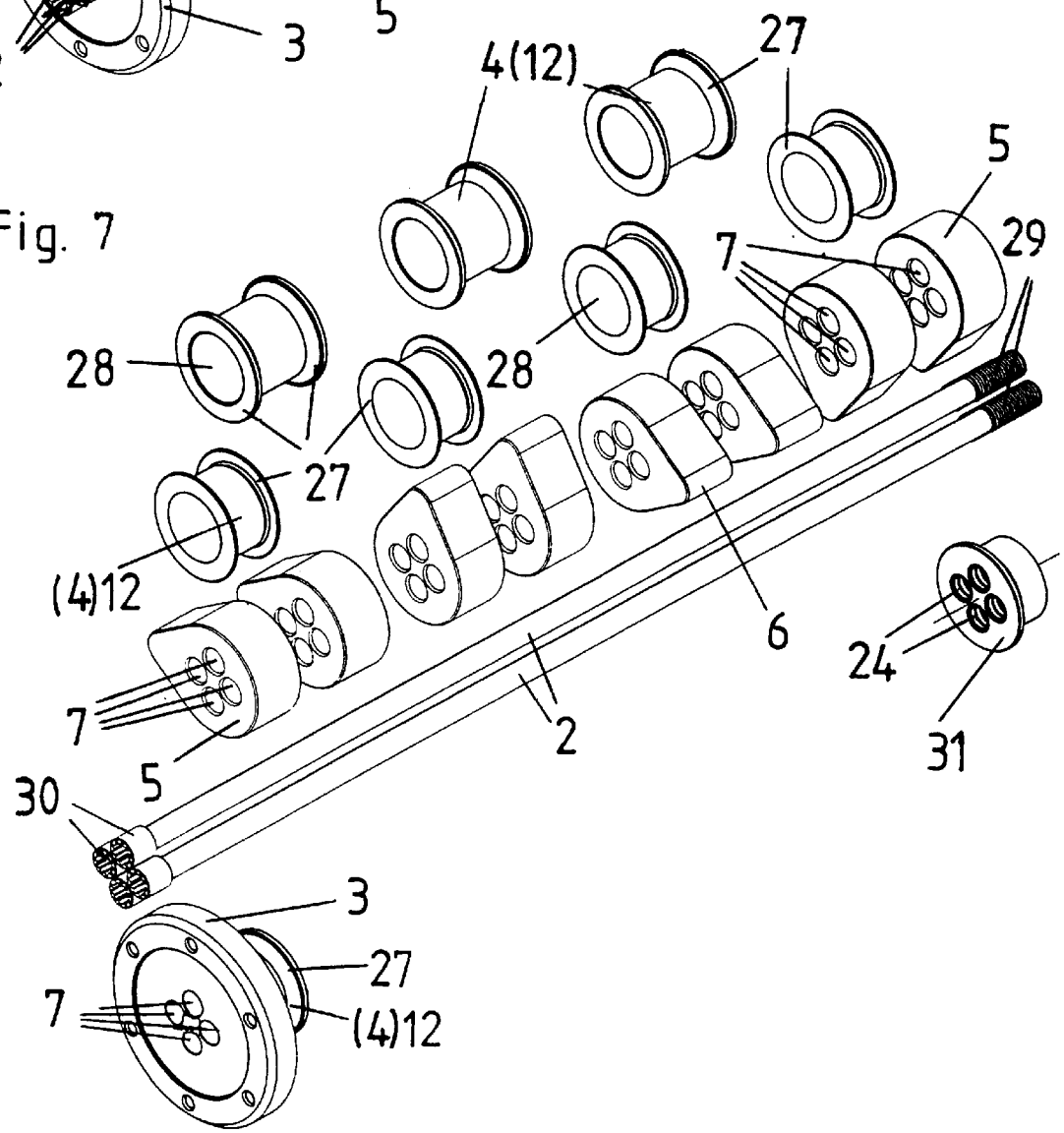
FIG. 7 is a perspective view showing the individual components of the embodiment of FIG. 6.

Various possibilities exist with regard to the axial fixation of the camshaft elements 3, 4, 5. They may be fixed, for instance, by means of screws 13 which engage female threads in the preferably hollow rods 2, as FIG. 1 shows. Between the groups of camshaft elements, sleeves 12 (FIG. 2) can be slipped onto at least one rod 2, thereby defining the spacing, and each sheath 12 can also be used to compensate for mass, if the sleeve is disposed on a rod 2 opposite the cam. FIGS. 6 and 7 show an axial variant, in which the rods 2 are threaded screws. For the fixation to one end, a disk 31 is provided that has threaded bores 24, into which the ends, which carry the threads 29, of the rods 2 are screwed. The heads 30 of these screws are braced against the drive elements 3.

FIG. 2 shows possible components for three-rod camshafts, and variants compared to FIG. 1 are also suggested. For instance, the connection of the camshaft elements 4, 5 of each group, when there is spacing between the rods 2, can be done such that a center bore 8, located in the geometric axis of the camshaft, is embodied in the camshaft elements 4, 5 and through it a screw 9 extends, onto whose protruding end a non-illustrated nut is screwed. Instead of the nut, one of the two camshaft elements 4, 5 in the center bore 8 may also have a thread which is engaged by the screw 9. It is also conceivable for only one of the two camshaft elements to have the center bore 8 while the second has a protruding threaded trunnion, onto which a nut can be screwed. The screw 9 can also be used for axial fastening, for instance if a spring washer 10 is placed between the cam element 5 and/or the bearing element 4 and/or the nut, the circumferential recesses 11 of the shim spreading apart or cutting into the rods 2 when the washer 10 is pressed flat against the rods 2. The sleeves are then unnecessary, or are provided only for mass compensation. At least one of the rods 2 could also have either a continuous thread or threaded segments, so that the elements 4, 5 or the groups can be axially fixed by means of two nuts.

The torsional strength of the camshaft may be further improved when reinforcement bodies are inserted into the central space inside the rods 2 between the camshaft elements. These bodies have longitudinal grooves on the periphery, and therefore fit partway around the rods, similar to the washers 10. In particular, the camshaft elements have a plurality of individual through openings 7, which each correspond to the cross section of one rod, which may be not merely circular but also triangular, quadrangular or hexagonal, for instance.

If the rods are close together, then a common through opening as in FIG. 5 is formed in the camshaft elements 3, 4 and 5. The opening is thereby composed, for instance, of six individual through openings 7 that merge with one another.

If the rods 2 rest on one another, then neither individual sleeves nor central connecting screws with shims can be used. In that case, instead, sleeves 12, cuffs or the like can be thrust between the camshaft elements 3, 4, 5, the sleeves or cuffs having a bore 28 of the form shown in FIG. 5 or FIG. 7. Such sleeves or cuffs may also be provided with an oblong slit and may encompass only about three quarters of the rods 2, if mass compensation is to be attained in this way.

A camshaft with rods 2 resting tightly against one another and possibly joined together already has increased torsional strength. This strength may be increased still further if the central space is filled by one further rod, so that all the rods 2 together form a tight bundle. The center rod 2, in an embodiment in accordance with FIG. 5 with six outer rods 2, has the same diameter. The diameter of the center rod is greater if more than six rods are provided around it, and less if fewer than six rods around it are provided. by way of example, camshaft elements 3, 4, 5 with circular openings 7, 8 can be first extruded and then drilled out. Preferably, however, the cam elements are made by a sintering process, which allows arbitrary shaping of the insertion openings and has superior dimensional accuracy. Since even when they are put together with the rods they are not subjected to any changes in temperature or force, no post-machining whatever is necessary. The result obtained is thus a building block or a modular system with only a few components, from which various possible types of camshaft can be assembled. The rods can comprise any suitable material, such as steel or aluminum and in particular fiber-reinforced plastics, and so forth.

The cam elements 5 or the bearing elements 4 with the cam 6 attached are each offset by a given angle. Since in an engine, per camshaft rotation, all the cylinders have to be opened if the crankshaft of the engine rotates twice during one rotation of the camshaft, the following forms for the cam offset result: 360°: n (number of cylinders)=offset angle of the cams. For instance, in a six-cylinder in-line engine, by this formula a six-rod camshaft can be used, which allows a cam position offset by an angle of 360°: 6=60°, or a multiple thereof. In that, only a single type of cam with a receiving opening as in FIG. 5 is needed in order to attain all the cam positions.

In the embodiment of FIG. 4, a group of camshaft elements is shown, the camshaft elements each comprising two bearing elements 4, each having a formed-on cam 6 and disposed in mirror symmetry on the rods 2, and the camshaft elements are joined together in one of the possible ways described. The two bearing elements 4 are surrounded by a roller bearing 14, whose inner ring may optionally even be formed by the bearing elements for themselves, and whose outer ring 15 is preferably provided with tangentially protruding fastening tabs for fixation to the engine block. The roller bearing 14 therefore at the same time acts as a one-piece bearing block, which when the camshaft is assembled is thrust onto the bearing elements 4 at the desired point. As a result, the conventional oil lubrication of the camshaft bearings may optionally be omitted, which can have a further cost advantage, if there is no other need for delivering oil to the cylinder heads of the engine. The roller bearing 14 may naturally also be used in the two group illustrations in FIG. 1, in which it is thrust onto a bearing element 4 upstream of the cam element 5. For the version of FIG. 4, conversely, a conventional two-piece bearing block is used. The one-piece bearing block 25 may naturally also be embodied without roller bearings, as shown in FIGS. 8–11, thus producing a conventional slide bearing of the bearing element 4.

In the embodiment of FIGS. 6 and 7, as already noted, the bearing elements 4 and the sleeve 12 are embodied in the same way, so that each sleeve 12 can also be used as a bearing element 4. The size of the opening 8 in the bearing elements 4 and sleeves 12 is equivalent to the envelope circle around the rods 4, which each rest without play against the wall of the opening. The sleeves 12 or bearing elements 4 may have thin walls and may have flanges 27 that rest on the cam elements 5 or the drive element 3.

In the embodiment of FIGS. 8–11, a camshaft 1 is shown that permits variable, individual control of each valve. In this version, the camshaft elements 3, 4, 5 are disposed nondisplaceably on three nondisplaceable rods 2, acting as carrier rods, and three displaceable rods 17. In addition, cam elements 16 that are displaceable on the rods 2, 17 are provided, and each of the three displaceable cam elements 16 is associated with one cam 6 of a bearing element 4, so that both cams 6, 16 control the same valve actuator 26. Each rod 17 is firmly joined to one cam element 16 and passes displaceably through openings 23 of the nondisplaceable camshaft elements 3, 4, 5. Assigned to the ends of the rods 17 that protrude at the face end out of the camshaft is an adjusting device 20, shown only schematically in FIG. 7, which by way of example has two coupled pressure-fluid-actuated adjusting pistons per rod 17.

Figure 9:
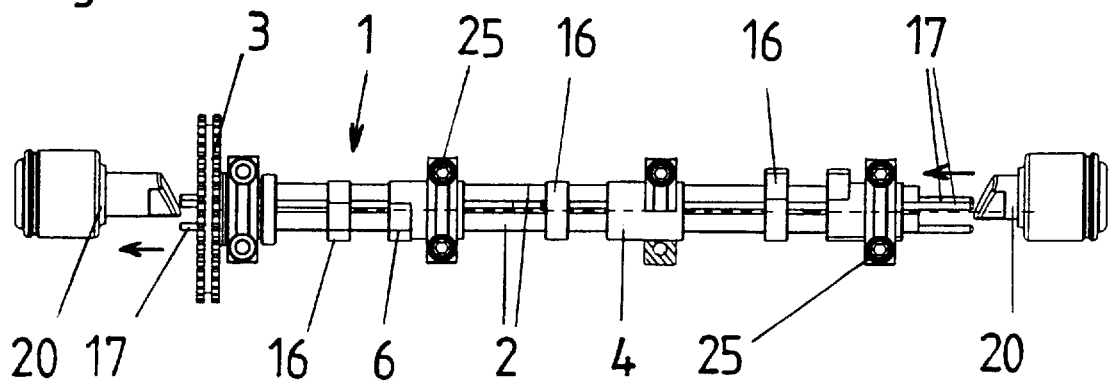
FIG. 9 is a side elevational view of the camshaft of FIG. 8.
Figure 10:
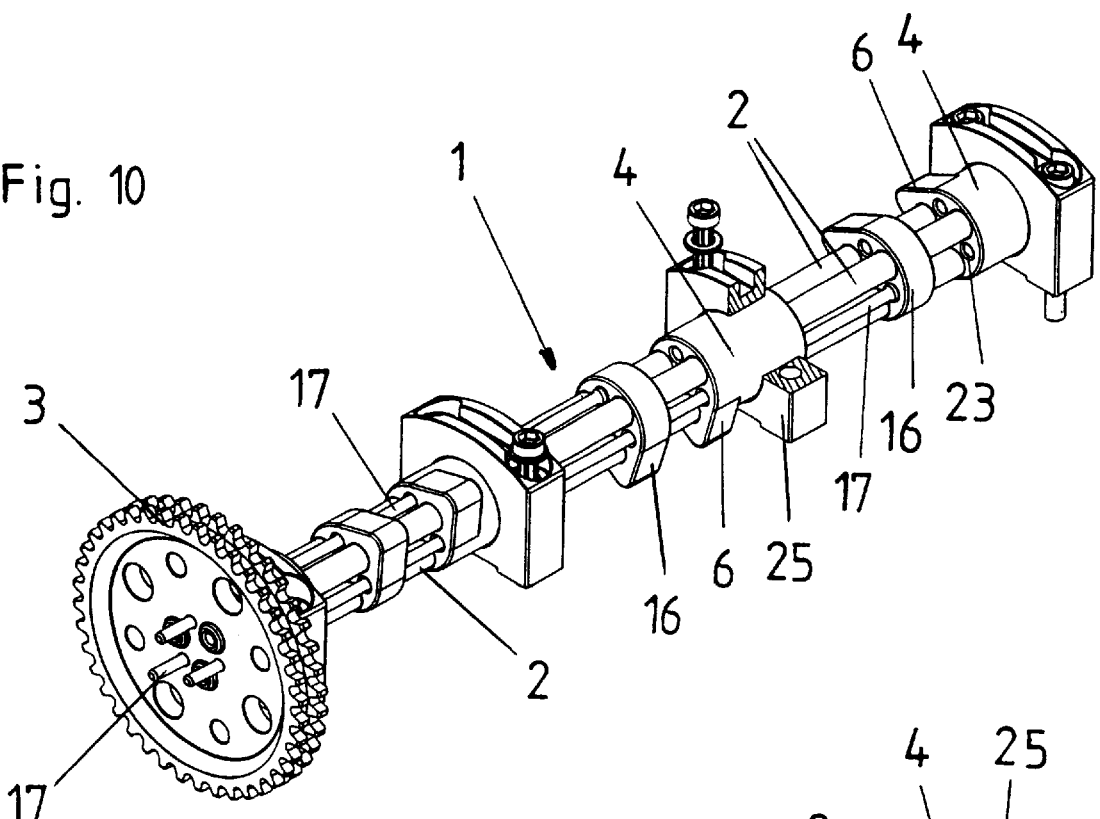
FIGS. 10 and 11 are perspective views showing the camshaft in two different positions.
Figure 11:
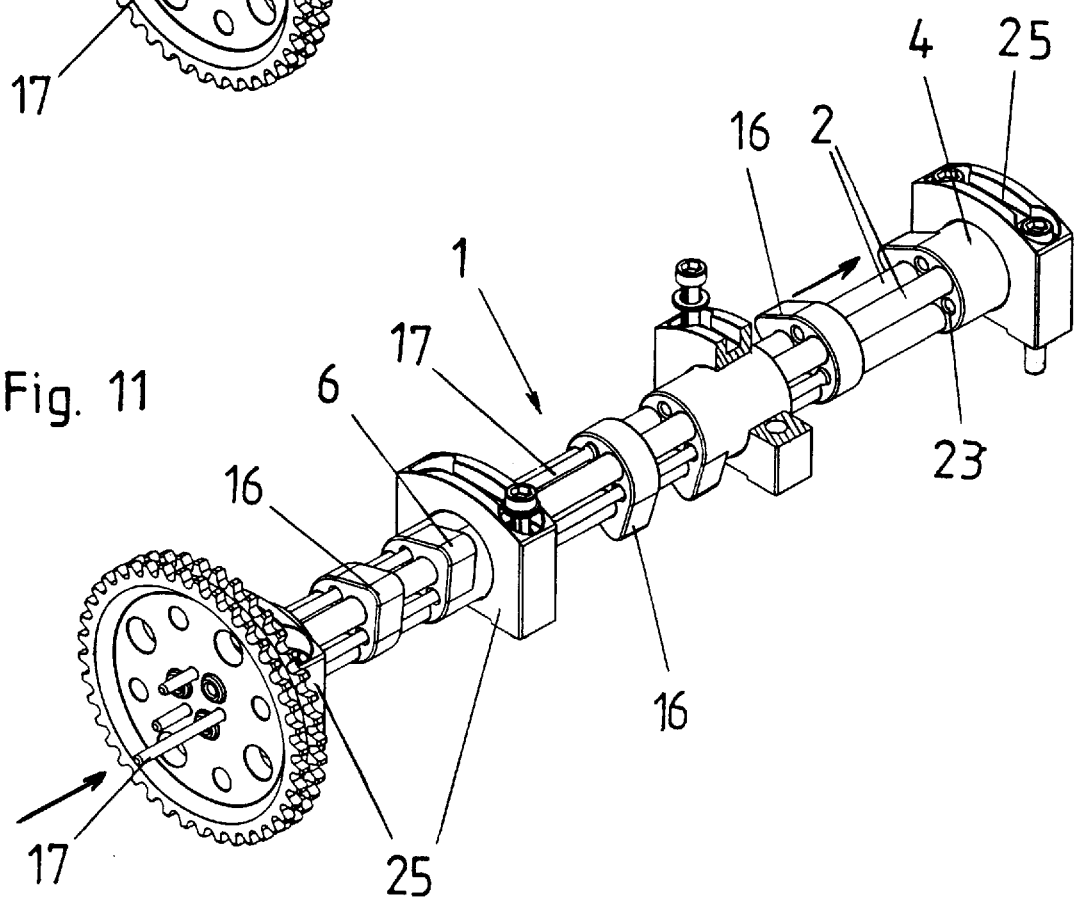

In the perspective views of FIGS. 10 and 11, for the sake of simplicity, portions of the rods 2, 17 have been cutoff, and the distinction between the two views resides in the displaceable cam element 16 shown on the right, which in the view of FIG. 8 is approaching the outermost bearing element 4, having the cam 6 oriented in the same direction, while in FIG. 9 it is displaced to the left. In FIG. 8, instead of the cam 6 the displaced, larger cam element 16 acts upon the valve actuator, while in FIG. 9 the cam 6 actuates the valve actuator. The displaceable rod 17 is preferably joined to the cam element 16 on the side opposite the cam.

Figure 12:
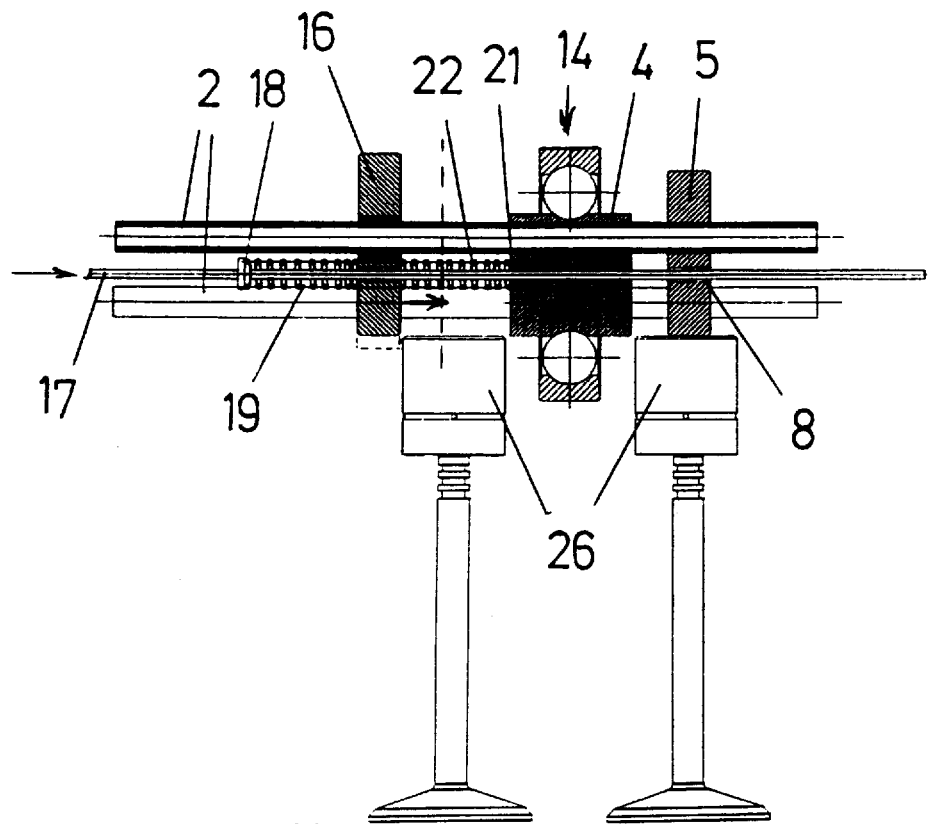
FIGS. 12 and 13 are fragmentary longitudinal sectional views through two further embodiments of a four-rod camshaft with displaceable cam elements.

In the embodiment of FIG. 12, a single displaceable rod 17 is centrally disposed. The rod 17 is surrounded by the nondisplaceable rods 2. The rod 17 has an annular abutment 18, on which a spring 18 rests. The displaceable cam element 16, in the position shown, is out of engagement with the valve actuator 26. In other words, the valve is closed, and the cylinder is out of action.

If the rod 17 is displaced to the right, then the spring 19 is compressed, if the cam element 16 assumes the position shown in dot-dashed lines, in which the cam region rests laterally on the valve actuator 26. As soon as the cam region has rotated away from the valve actuator 26, the cam element 16 is displaced into a working position above the valve actuator 26, which requires only slight adjusting forces, and the force of the spring 19, which like the identical restoring spring 22 is approximately half-compressed, is sufficient. If the rod 17 is displaced back, then the restoring spring 22 can relax once the valve is back in its closing position, in which the valve actuator 26 pressed with only slight pressure against the base circle region or, at a slight distance from it, rests on a non-illustrated stop, and the displaceable cam element 16 is moved back into its position of repose shown in FIG. 12. The restoring spring 22 is supported on the bearing element 4.

Figure 13:
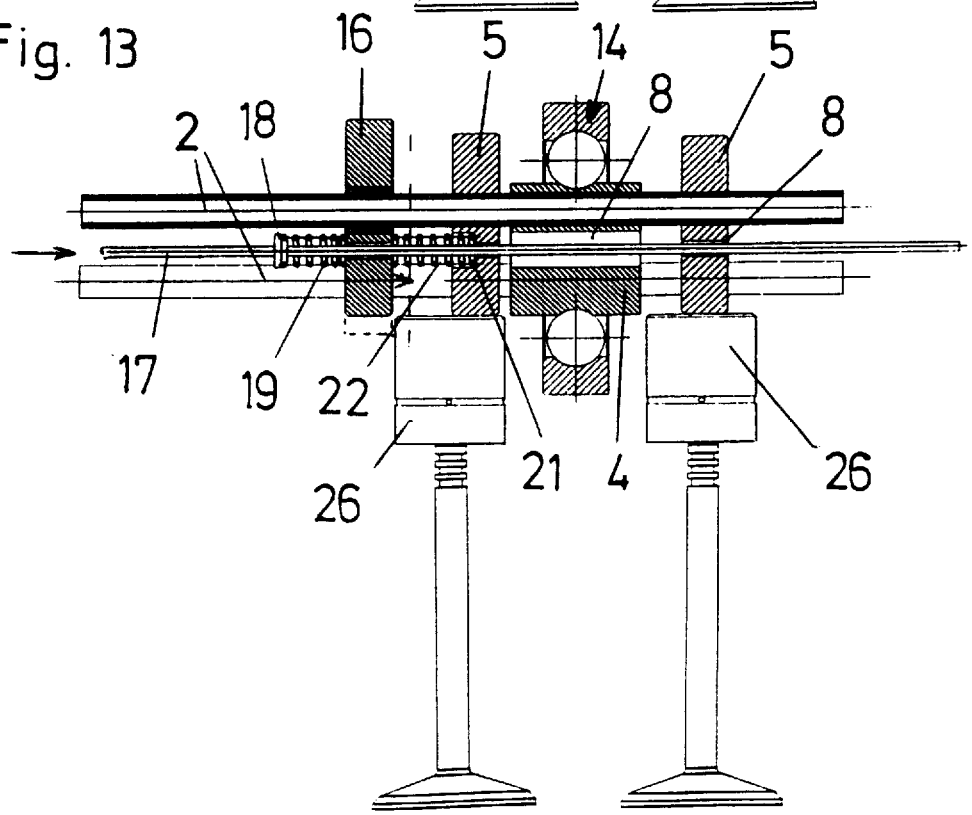

FIG. 13 refers to an embodiment in which a nondisplaceable cam element 5 is assigned a displaceable cam element 16, which has a greater cam lobe (larger rise of the follower). Once the cam element 16 has been displaced as described in conjunction with FIG. 12, the opening period of the valve is varied. In this embodiment, the restoring spring 22 is supported on the cam element 5.

I claim:

1. A camshaft, comprising:
   a plurality of mutually parallel, non-coaxial rods; and
   camshaft elements mounted on said rods, said camshaft elements including a drive element attached to said rods for rotatingly driving said rods, bearing elements, and cam elements mounted on said rods.

2. The camshaft according to claim 1, wherein said plurality or rods is a number of rods selected from the group consisting of three rods, four rods, and six rods.

3. The camshaft according to claim 1, wherein said rods are disposed in a mutually spaced-apart relationship.

4. The camshaft according to claim 1, which further comprises a plurality of sleeves on at least one rod between respective ones of said camshaft elements.

5. The camshaft according to claim 1, which further comprises connecting elements interconnecting selected said camshaft elements into functional groups.

6. The camshaft according to claim 5, wherein said connecting elements include spring washers axially clamping said camshaft elements of each said functional group firmly to said rods.

7. The camshaft according to claim 1, which further comprises a one-piece bearing block thrust onto each said bearing element.

8. The camshaft according to claim 7, wherein said bearing block includes a roller bearing.

9. The camshaft according to claim 1, wherein said rods extend parallel to a given axis defining a longitudinal direction of the camshaft, at least one of said rods being displaceable in the longitudinal direction and at least one of said cam elements being mounted on said displaceable rod.

10. The camshaft according to claim 9, wherein said cam elements include a plurality of displaceable cam elements disposed on a common, displaceable rod, and including an adjusting spring disposed about said displaceable rod, each cam element is disposed on said displaceable rod so as to be displaceable by a displacement length of said displaceable rod by spring action in a displacement direction.

11. The camshaft according to claim 10, which further comprises one annular abutment on said displaceable rod for each of said displaceable cam elements, said annular abutment bracing against said adjusting spring.

12. The camshaft according to claim 10, which further comprises an abutment for a restoring spring formed on a non-displaceable camshaft element.

13. The camshaft according to claim 9, wherein each said displaceable camshaft element is fixed to a respective displaceable rod.

14. The camshaft according to claim 9, wherein a given said cam element, which is not longitudinally displaceable on the camshaft, is assigned at least one displaceable cam element with a greater peripheral contour.

15. The camshaft according to claim 9, which comprises one actuator operatively assigned to each said displaceable rod on at least one end thereof.

16. The camshaft according to claim 9, wherein each displaceable rod has a smaller diameter than each nondisplaceable rod upon which said camshaft elements are carried.

* * * * *